United States Patent
Yoshizawa

(10) Patent No.: US 9,807,665 B2
(45) Date of Patent: Oct. 31, 2017

(54) COMMUNICATION CONTROL DEVICE, COMMUNICATION CONTROL METHOD, AND TERMINAL DEVICE

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/781,482

(22) PCT Filed: Jun. 24, 2014

(86) PCT No.: PCT/JP2014/066743
§ 371 (c)(1),
(2) Date: Sep. 30, 2015

(87) PCT Pub. No.: WO2015/022813
PCT Pub. Date: Feb. 19, 2015

(65) Prior Publication Data
US 2016/0183152 A1 Jun. 23, 2016

(30) Foreign Application Priority Data
Aug. 12, 2013 (JP) .................. 2013-167486

(51) Int. Cl.
*H04W 36/00* (2009.01)
*H04W 36/30* (2009.01)
(Continued)

(52) U.S. Cl.
CPC .............. *H04W 36/30* (2013.01); *H04L 1/00* (2013.01); *H04W 16/32* (2013.01); *H04W 24/00* (2013.01);
(Continued)

(58) Field of Classification Search
CPC ..... H04W 36/30; H04W 16/32; H04W 24/00; H04W 24/02; H04W 24/10; H04W 48/00;
(Continued)

(56) References Cited

U.S. PATENT DOCUMENTS 9,119,147 B2 * 8/2015 Duan ................ H04W 52/0206
9,532,248 B2 * 12/2016 Worrall ................ H04W 48/16
(Continued)

FOREIGN PATENT DOCUMENTS

EP 2 677 803 A1 12/2013
JP 10-51835 A 2/1998
(Continued)

OTHER PUBLICATIONS

International Search Report dated Sep. 9, 2014 in PCT/JP2014/066743.
(Continued)

*Primary Examiner* — Mong-Thuy Tran
(74) *Attorney, Agent, or Firm* — Oblon, McClelland, Maier & Neustadt, L.L.P.

(57) ABSTRACT

[Object] To make it possible to suppress deterioration in communication quality of radio communication in a small cell while power consumption of a base station of the small cell is reduced.
[Solution] Provided is a communication control device including: an acquisition unit configured to acquire a result of measurement performed by a terminal device with regard to one or more small cells which are partly or entirely overlapped by a macrocell; and a selection unit configured to select a base station which is not to be set in an idle state from base stations of the one or more small cells based on the result of the measurement.

12 Claims, 12 Drawing Sheets

(51) Int. Cl.
  *H04W 16/32* (2009.01)
  *H04W 48/16* (2009.01)
  *H04W 72/04* (2009.01)
  *H04W 52/02* (2009.01)
  *H04L 1/00* (2006.01)
  *H04W 24/00* (2009.01)
  *H04W 48/00* (2009.01)
  *H04W 48/20* (2009.01)
  *H04W 24/02* (2009.01)
  *H04W 24/10* (2009.01)
  *H04W 28/06* (2009.01)
  *H04W 84/04* (2009.01)

(52) U.S. Cl.
  CPC ........... *H04W 24/02* (2013.01); *H04W 24/10* (2013.01); *H04W 48/00* (2013.01); *H04W 48/16* (2013.01); *H04W 48/20* (2013.01); *H04W 52/0206* (2013.01); *H04W 72/04* (2013.01); *H04W 28/06* (2013.01); *H04W 84/045* (2013.01); *Y02B 60/50* (2013.01)

(58) Field of Classification Search
  CPC . H04W 48/16; H04W 48/20; H04W 52/0206; H04W 72/04; H04W 28/06; H04W 84/045; H04L 1/00; Y02B 60/50
  USPC .......................................... 455/444; 370/331
  See application file for complete search history.

(56) References Cited

U.S. PATENT DOCUMENTS

| | | | | |
|---|---|---|---|---|
| 2002/0105913 | A1* | 8/2002 | Miya | H04W 36/30 370/241 |
| 2009/0111383 | A1* | 4/2009 | Eckert | H04W 36/30 455/67.11 |
| 2011/0170466 | A1* | 7/2011 | Kwun | H04W 52/0235 370/311 |
| 2011/0201279 | A1* | 8/2011 | Suzuki | H04W 24/10 455/67.11 |
| 2012/0142328 | A1* | 6/2012 | Awoniyi | H04W 36/22 455/418 |
| 2012/0195255 | A1* | 8/2012 | Nylander | H04W 60/04 370/328 |
| 2012/0263145 | A1* | 10/2012 | Marinier | H04W 36/22 370/331 |
| 2012/0289269 | A1 | 11/2012 | Kumagai | |
| 2012/0309394 | A1* | 12/2012 | Radulescu | H04W 36/0055 455/436 |
| 2013/0201943 | A1 | 8/2013 | De Domenico et al. | |
| 2013/0310040 | A1* | 11/2013 | Kwun | H04W 52/0235 455/436 |
| 2014/0073334 | A1* | 3/2014 | Chiang | H04W 76/00 455/450 |
| 2015/0215852 | A1* | 7/2015 | Gou | H04W 48/16 455/434 |
| 2015/0223185 | A1* | 8/2015 | Harris | G01S 5/0236 455/456.5 |

FOREIGN PATENT DOCUMENTS

| | | |
|---|---|---|
| JP | 2010-283806 A | 12/2010 |
| JP | 2011-49859 A | 3/2011 |
| JP | 2011-49890 A | 3/2011 |
| JP | 2011-91748 A | 5/2011 |
| JP | 2011-109401 A | 6/2011 |
| JP | 2013-516884 A | 5/2013 |
| JP | 2013-121086 | 6/2013 |
| JP | 2013-528959 A | 7/2013 |
| JP | 2014-96779 A | 5/2014 |
| WO | WO 2012/146187 A1 | 1/2012 |
| WO | WO 2013/021531 A1 | 2/2013 |

OTHER PUBLICATIONS

"Physical layer aspects for dual layer connectivity in small cells" NEC Group—3GPP TSG RAN WG1 Meeting #74, Aug. 2013, 5 Pages.
Office Action issued in Japanese Application No. 2013-167489, dated Mar. 14, 2017, With English translation (21 pages).
Extended European Search Report issued in Application No. 14836054.8, dated Feb. 21, 2017. (11 pages).

\* cited by examiner

FIG.3

| SMALL CELL ID | FREQUENCY CHANNEL INFORMATION | TIMING INFORMATION |
|---|---|---|
| #1 | F1 | T1 |
| #2 | F2 | T2 |
| #3 | F3 | T3 |
| ... | ... | ... |

COMMUNICATION CONTROL DEVICE, COMMUNICATION CONTROL METHOD, AND TERMINAL DEVICE

TECHNICAL FIELD

The present disclosure relates to a communication control device, a communication control method, and a terminal device.

BACKGROUND ART

As the amount of communication data has been rapidly increasing due to the proliferation of smartphones in recent years, further expansion of system capacities in cellular communication has been required. To this end, in Release 12 of Third Generation Partnership Project (3GPP), a new architecture for small cells is being currently discussed. In this new architecture, in a small cell disposed within a macrocell, a different frequency band from a frequency band used in the macrocell is used. Accordingly, an advantage of division of cells can be obtained more efficiently.

Topics of discussion with regard to small cells include reduction of power consumption of a base station in a small cell. To this end, for example, causing a base station in a small cell to activate or to be in an idle state (dormant) depending on a state of use of the small cell is considered. As an example, data traffic is extremely small at night in office regions. As another example, in sport stadiums, data traffic is extremely heavy in a specific time zone when an event takes place, but is extremely light in other time zones. As still another example, a base station installed in a home for the purpose of off-loading is not used in most time zones in many cases. As small cells become more widespread and the number of small cells becomes extremely large from now on, the extremely huge amount of overall power consumption can be reduced by cutting power consumption of base stations of small cells. To this end, technologies for reducing power consumption of base stations of small cells have been proposed.

For example, Patent Literature 1 and Patent Literature 2 disclose technologies in which, when it is determined that there is no radio communication terminal in the vicinity of a femtocell, a base station in the femtocell is set to stop receiving radio waves, and when it is determined that there is a radio communication terminal in the vicinity of a femtocell, a base station in the femtocell is set to start receiving radio waves. In addition, Patent Literature 3 discloses a technology in which, based on a position of a mobile terminal device which is obtained through the Global Positioning System (GPS), a small cell which can process communication of the mobile terminal device is specified and power supply to the specified small cell is resumed.

CITATION LIST

Patent Literature

Patent Literature 1: JP 2011-049859A
Patent Literature 2: JP 2011-049890A
Patent Literature 3: JP 2011-091748A

SUMMARY OF INVENTION

Technical Problem

In the technologies disclosed in Patent Literatures 1 to 3 mentioned above, however, since a small cell to activate is selected based only on a position of a terminal device (or an area in which the position of the device is included), it is hard to guarantee that a proper small cell is selected. For example, even when a base station of a certain small cell is closer to a terminal device, there is also a possibility of a channel between the base station and the terminal device being unfavorable due to a large obstacle placed between the base station and the terminal device, or the like. For this reason, while a base station of a small cell that is closer to a terminal device is activated, quality of radio communication between the terminal device and the base station can be lowered. As a result, for example, convenience of the user of the terminal device declines.

Therefore, it is desirable to provide a mechanism which can suppress deterioration in communication quality of radio communication in a small cell while power consumption of a base station of the small cell is reduced.

Solution to Problem

According to the present disclosure, there is provided a communication control device including: an acquisition unit configured to acquire a result of measurement performed by a terminal device with regard to one or more small cells which are partly or entirely overlapped by a macrocell; and a selection unit configured to select a base station which is not to be set in an idle state from base stations of the one or more small cells based on the result of the measurement.

According to the present disclosure, there is provided a communication control method including: acquiring a result of measurement performed by a terminal device with regard to one or more small cells which are partly or entirely overlapped by a macrocell; and selecting, using a processor, a base station which is not to be set in an idle state from base stations of the one or more small cells based on the result of the measurement.

According to the present disclosure, there is provided a communication control device including: a communication control unit configured to control transmission of a signal for measurement performed by a terminal device with regard to a small cell which is partly or entirely overlapped by a macrocell; and a state control unit configured to refrain from causing a base station of the small cell to be in an idle state when the base station of the small cell is selected as a base station that is not to be set in the idle state based on a result of the measurement.

According to the present disclosure, there is provided a terminal device including: an acquisition unit configured to acquire a result of measurement with regard to one or more small cells which are partly or entirely overlapped by a macrocell; and a providing unit configured to provide the result of the measurement to a communication control device which selects a base station which is not to be set in an idle state from base stations of the one or more small cells based on the result of the measurement.

Advantageous Effects of Invention

According to the present disclosure described above, degradation in communication quality of radio communication in a small cell can be suppressed while power consumption of a base station of the small cell is reduced. Note that the above-described effects are not necessarily limitative, and along with or instead of the effects, any effect which is expected to be introduced in the present specification or other effects which can be understood from the present specification may be exhibited.

BRIEF DESCRIPTION OF DRAWINGS

FIG. 3 is a descriptive diagram for describing an example of small cell information according to an embodiment.

DESCRIPTION OF EMBODIMENTS

Figure 1:
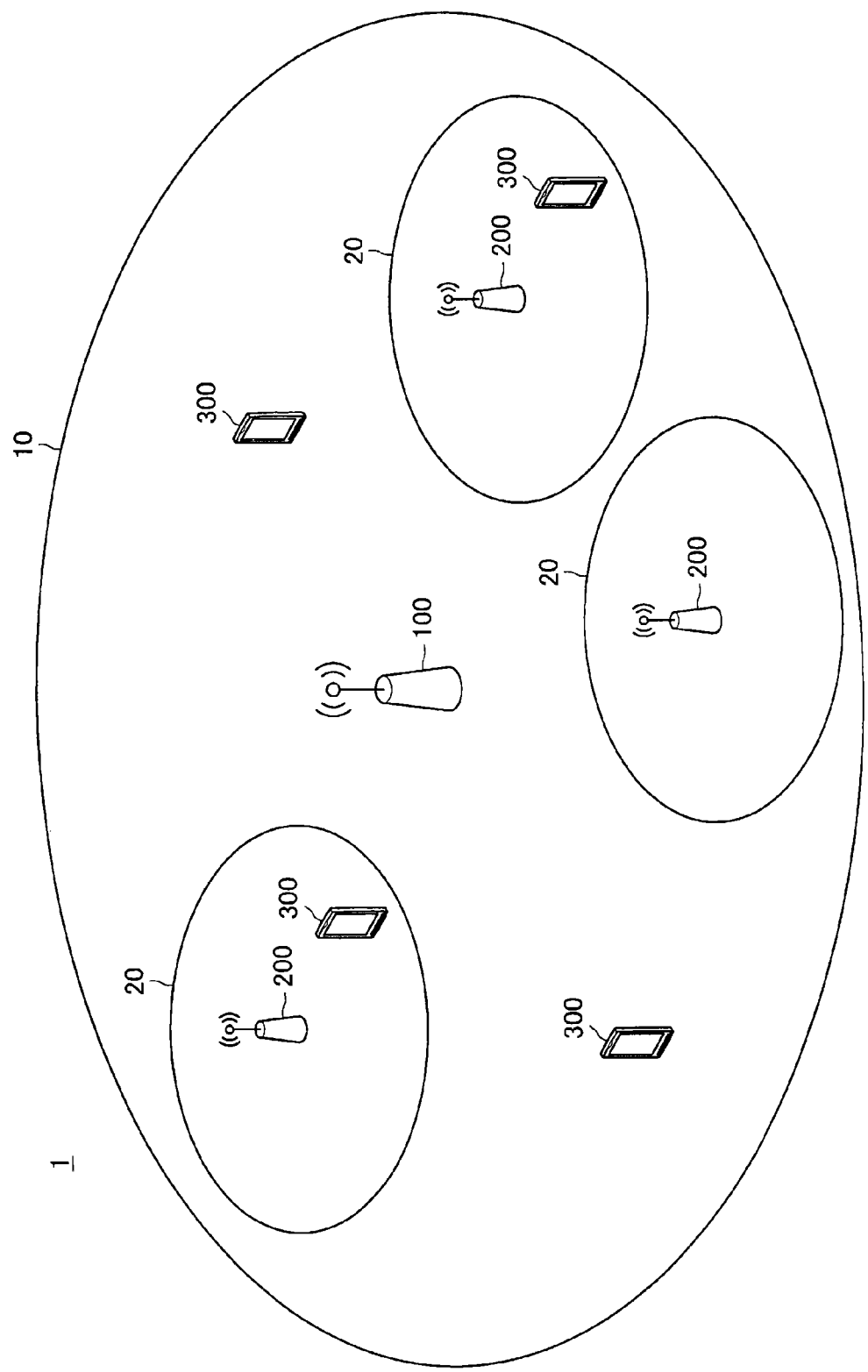
FIG. 1 is an illustrative diagram showing an example of a schematic configuration of a communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, there are cases in which a plurality of constituent elements with substantially the same functional configuration are distinguished by affixing different letters to the end of the same reference numerals. For example, a plurality of constitutions with substantially the same functional configuration are distinguished as in the case of terminal devices 300A, 300B, and 300C, when necessary. However, when it is not particularly necessary to distinguish a plurality of constituent elements with substantially the same functional configuration, only the same reference numeral is given thereto. For example, when it is not particularly necessary to distinguish the terminal devices 300A, 300B, and 300C, they are referred to as simply terminal devices 300.

Note that description will be provided in the following order.

1. Outline of a configuration of a communication system according to an embodiment
2. Configuration of a macro base station
3. Configuration of a small base station
4. Configuration of a terminal device
5. Process flow
6. Modified examples
7. Application examples
8. Conclusion

1. Outline of a Configuration of a Communication System According to an Embodiment First, an outline of a configuration of a communication system 1 according to an embodiment of the present disclosure will be described with reference to FIG. 1. FIG. 1 is an illustrative diagram showing an example of a schematic configuration of the communication system 1 according to the present embodiment. Referring to FIG. 1, the communication system 1 includes a base station 100 of a macrocell 10 (which will be referred to hereinafter as a "macro base station"), base stations 200 of small cells 20 (which will be referred to hereinafter as "small base stations"), and terminal devices 300. The communication system 1 is a system which conforms to, for example, Long Term Evolution (LTE), LTE-Advanced, or a communication scheme equivalent thereto. In addition, each small cell 20 is partly or entirely overlapped by the macrocell 10.

The macro base station 100 performs radio communication with the terminal devices 300 positioned within the macrocell 10. In addition, the small base stations 200 perform radio communication with the terminal devices 300 positioned within the small cells 20. For example, in the small cells 20, a different frequency band from the frequency band used in the macrocell 10 is used. That is, a frequency band used by the small base stations 200 for radio communication in the small cells 20 is different from the frequency band used by the macro base station 100 for radio communication in the macrocell 10. These frequency bands respectively include, for example, one or more component carriers (CCs). A CC is a band used in carrier aggregation of LTE-Advanced.

In addition, particularly in the present embodiment, the small base stations 200 can be in an idle state (dormant). The small base stations 200 in the idle state do not perform, for example, transmission in the downlink and reception in the uplink. In other words, the small base stations 200 in the idle state stop transmission in the downlink and reception in the uplink. In addition, even from the idle state, the small base stations 200 can be activated thereafter and perform transmission in the downlink and reception in the uplink.

The terminal devices 300 perform radio communication with the macro base station 100 when the devices are positioned within the macrocell 10. In addition, the terminal devices 300 perform radio communication with small base stations 200 when the devices are positioned within the small cells 20.

In addition, the terminal devices 300 can perform radio communication using, for example, one principal frequency band and one or more auxiliary frequency bands. To be more specific, the terminal devices 300 have, for example, the capability of carrier aggregation, and thus can perform radio communication using one primary component carrier (PCC) and one or more secondary component carriers (SCCs). Furthermore, the terminal devices 300 can perform radio communication with the macro base station 100 and the small base stations 200 by using a frequency band (CC) that is set for the macrocell 10 as a principal frequency band (PCC) and a frequency band (CC) that is set for the small cells 20 as an auxiliary frequency band (SCC).

2. Configuration of a Macro Base Station

Figure 2:
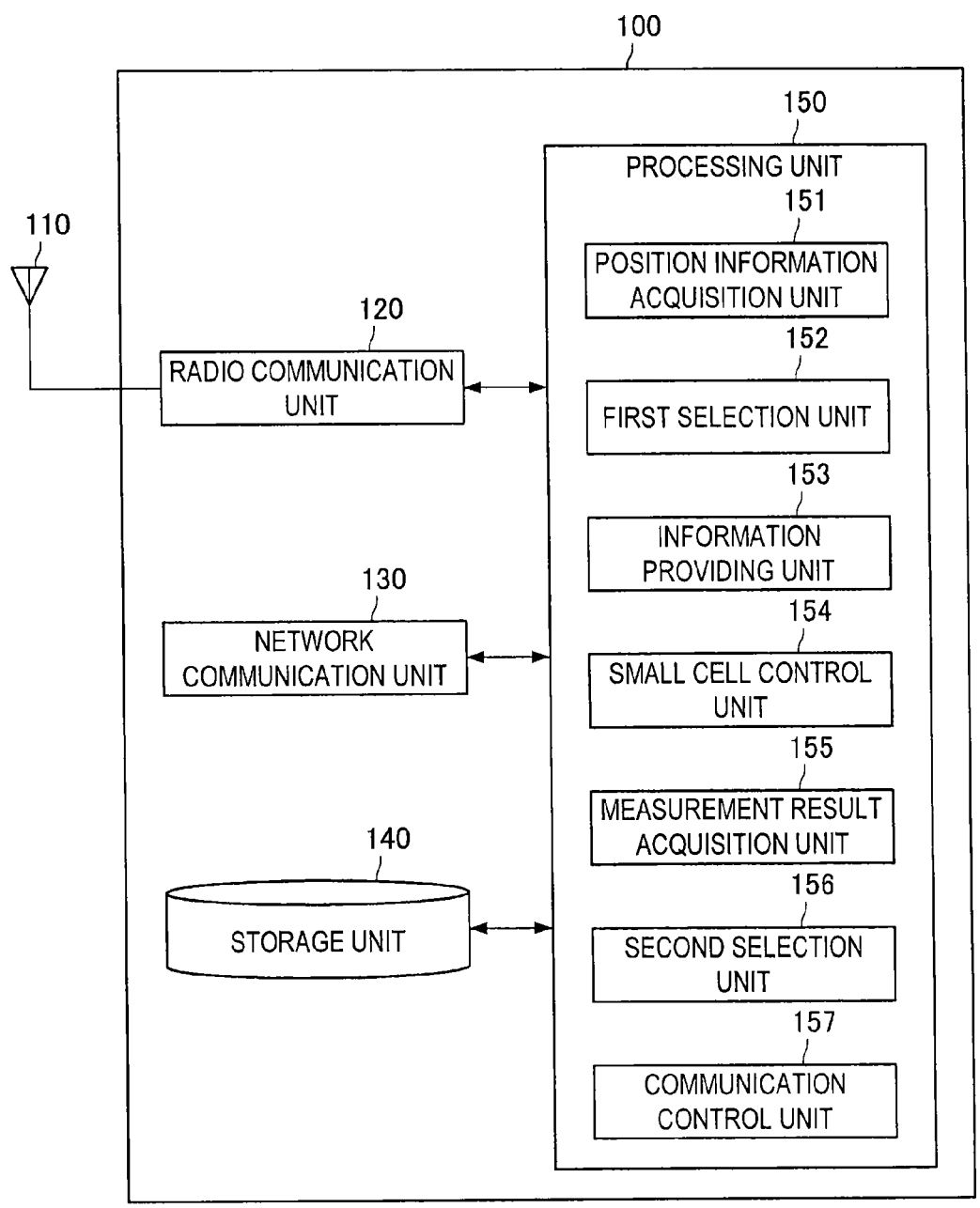
FIG. 2 is a block diagram showing an example of a configuration of a macro base station according to an embodiment.

An example of a configuration of the macro base station 100 according to the present embodiment will be described with reference to FIGS. 2 to 4. FIG. 2 is a block diagram showing an example of a configuration of the macro base station 100 according to the present embodiment. Referring to FIG. 2, the macro base station 100 includes an antenna unit 110, a radio communication unit 120, a network communication unit 130, a storage unit 140, and a processing unit 150.

(Antenna Unit 110)

The antenna unit 110 receives radio signals and outputs the received radio signals to the radio communication unit 120. In addition, the antenna unit 110 transmits transmission signals output by the radio communication unit 120.

(Radio Communication Unit 120)

The radio communication unit 120 performs radio communication with the terminal devices 300 positioned within the macrocell 10. For example, the radio communication unit 120 performs radio communication with the terminal devices 300 using a frequency band that is set for the macrocell 10. The frequency band includes, for example, one or more CCs.

(Network Communication Unit 130)

The network communication unit 130 communicates with other communication nodes. For example, the network communication unit 130 communicates with the small base stations 200. In addition, the network communication unit 130 communicates with, for example, other macro base stations 100. In addition, the network communication unit 130 communicates with, for example, core network nodes.

(Storage Unit 140)

The storage unit 140 stores programs and data for operations of the macro base station 100.

For example, the storage unit 140 stores information relating to the small base stations 200. The information includes, for example, small cell IDs of the small cells 20 formed by the small base stations 200, position information that indicates the positions of the small base stations 200, frequency channel information that indicates a frequency channel on which reference signals are transmitted by the small base stations 200, time information that indicates a time taken for the small base stations 200 to start transmission of the reference signals from the idle state, and the like.

(Processing Unit 150)

The processing unit 150 provides various functions of the macro base station 100. The processing unit 150 includes a position information acquisition unit 151, a first selection unit 152, an information providing unit 153, a small cell control unit 154, a measurement result acquisition unit 155, a second selection unit 156, and a communication control unit 157.

(Position Information Acquisition Unit 151)

The position information acquisition unit 151 acquires position information that indicates a position of each terminal device 300.

For example, the position information acquisition unit 151 transmits a position information requesting message that requests provision of position information that indicates the position of each terminal device 300 to the terminal device 300 via the radio communication unit 120. Then, the terminal device 300 transmits the position information, and the position information acquisition unit 151 acquires the position information via the radio communication unit 120. As an example, the position information requesting message may be an RRC connection reconfiguration message.

Note that the position information acquisition unit 151 may acquire the position information through positioning of the terminal device 300 using an uplink signal (for example, a reference signal) transmitted from the terminal device 300, instead of being provided with position information from the terminal device 300 as described above. The positioning may be positioning based on a timing advance (TA) value and an angle of arrival (AoA) with respect to the terminal device 300, or may be positioning of the terminal device 300 performed by a plurality of macro base stations 100.

(First Selection Unit 152)

The first selection unit 152 selects one or more small cells 20 based on the position information indicating the position of the terminal device 300.

For example, the first selection unit 152 selects one or more small cells 20 neighboring the position of the terminal device 300 indicated by the position information from the small cells 20 which are partly or entirely overlapped by the macrocell 10. As an example, the first selection unit 152 selects small cells 20 of the small base stations 200 present in a predetermined distance from the terminal device 300.

Accordingly, for example, a small base station 200 having a possibility of performing radio communication with the terminal device 300 is selected, and a small base station 200 having no possibility of performing radio communication with the terminal device 300 is not selected. As a result, power consumption can be further reduced.

(Information Providing Unit 153)

The transmission control unit 152 provides information regarding the one or more small cells 20 (which will be referred to hereinafter as "small cell information") to the terminal device 300.

For example, the small cell information includes the IDs of the one or more small cells 20 (which will be referred to hereinafter as "small cell IDs"). As an example, each small cell ID is an E-UTRAN Cell Global ID (ECGI). An ECGI is a combination of a public land mobile network (PLMN) ID and a cell ID. In addition, a PLMN is a combination of a country code and an operator code, and is an identifier of a public network. With such a small cell ID, the terminal device 300 can identify the selected small cell 20.

In addition, the small cell information includes, for example, information that indicates a frequency channel on which signals for measuring (measurement) (which will be referred to hereinafter as "measurement signals") are transmitted by each of the small base stations 200 of the one or more small cells 20 (which will be referred to hereinafter as "frequency channel information"). As an example, the frequency channel information is an E-UTRA Absolute Frequency Channel Number (EARFCN). Accordingly, for example, the terminal device 300 can receive the measurement signals without searching for a frequency channel on which the measurement signals are transmitted. For this reason, a load of measurement on the terminal device 300 can be lightened.

In addition, the small cell information includes, for example, information that indicates timings at which the measurement signals are transmitted by each of the small base stations 200 of the one or more small cells 20 (which will be referred to hereinafter as "timing information"). As an example, the timing information is a system frame number (SFN) or a combination of an SFN and a subframe number. Accordingly, the terminal device 300 can, for example, start receiving signals at timings at which the measurement signals are transmitted. That is, the terminal device 300 does not have to continuously receive signals over a long period of time. For this reason, a load of measurement on the terminal device 300 can be lightened.

In addition, each of the timings at which the measurement signals are transmitted depends on, for example, time taken for each of the small base stations 200 of the one or more small cells 20 to be activated from the idle state. For example, the information providing unit 153 decides each of the timings, taking the time taken for each of the small base stations 200 of the one or more small cells 20 to be activated from the idle state into consideration, and provides information that indicates the decided timing (timing information). Accordingly, it is possible to notify the terminal device 300 of a proper transmission timing even when time taken to be activated from the idle state is different from the small base stations 200 of the one or more small cells 20.

As described above, the small cell information is provided to the terminal device 300. Accordingly, a load of measurement on the terminal device 300 can be lightened. A specific example of the small cell information will be described with reference to FIG. 3.

FIG. 3 is a descriptive diagram for describing an example of the small cell information according to the present embodiment. Referring to FIG. 3, the small cell information in the form of a list is shown. As described above, the small cell information includes small cell IDs, frequency channel information, and timing information of the respective small cell 20.

Note that the measurement information is, for example, a reference signal. As an example, the measurement information is a cell-specific reference signal (CRS) or a common reference signal (CRS).

(Small Cell Control Unit 154)

The small cell control unit 154 controls the small base stations 200 of the one or more small cells 20.

Control Over Transmission of a Measurement Signal

The small cell control unit 154 causes, for example, the small base stations 200 of the one or more small cells 20 to transmit measurement signals.

To be more specific, the small cell control unit 154 causes the small base stations 200 of the one or more small cells 20 to be activated. As an example, the small cell control unit 154 transmits an activation instruction message for instructing the small base stations 200 of the one or more small cells 20 to be activated via the network communication unit 130. Then, the small base stations 200 of the one or more small cells 20 are activated and resume transmission of downlink signals including measurement signals. As described above, the measurement signals are, for example, reference signals.

Accordingly, even when the small base stations 200 are in the idle state and thus in a state in which downlink transmission is not performed, measurement with respect to the one or more small cells 20 can be performed thereafter.

In addition, the small cell control unit 154 causes, for example, the small base stations 200 of the one or more small cells 20 to transmit measurement signals at transmission timings that are notified of in the small cell information. As an example, information indicating the transmission timings is included in the activation instruction message, and the small base stations 200 resume transmission of reference signals (or downlink signals including the reference signals) at the timings.

Note that the small base stations 200 of the one or more small cells 20 may only resume transmission in the downlink and stop reception in the uplink.

More control of the small cell control unit 154 will be described after description of the measurement result acquisition unit 155 and the second selection unit 156.

(Measurement Result Acquisition Unit 155)

The measurement result acquisition unit 155 acquires the result of measurement (which will be referred to hereinafter as "measurement result") by the terminal devices 300 with regard to the one or more small cells 20.

For example, when each terminal device 300 completes measurement with regard to the one or more small cells 20, the terminal device provides the result of the measurement (i.e., measurement result) to the macro base station 100, and the measurement result acquisition unit 155 acquires the measurement result via the radio communication unit 120. As an example, the measurement result is provided as a measurement report.

The measurement result includes, for example, information regarding reception power or quality of a measurement signal. To be more specific, the measurement signal is, for example, a reference signal as described above. In addition, the information regarding reception power or quality of the measurement signal is, for example, reference signal received power (RSRP) or reference signal received quality (RSRQ).

In addition, the measurement result is, for example, information regarding part of the one or more small cells 20. To be more specific, the measurement result is, for example, information regarding the small cells 20 accompanied with RSRP or RSRQ that satisfies a predetermined condition (for example, RSRP or RSRQ which exceeds a predetermined threshold value). As an example, the measurement result includes RSRP or RSRQ which satisfies a predetermined condition and the small cell IDs of the small cells 20 accompanied with the RSRP or RSRQ. By providing the information regarding the part of the small cells 20 as the measurement result in this manner, for example, overhead caused by transmission of the measurement result can be suppressed.

Note that the measurement result may be information regarding each of the one or more small cells 20.

In addition, when the reception power or quality of the measurement signal with regard to all of the one or more small cells 20 does not exceed the predetermined threshold value, the measurement result may include information indicating that the reception power or the quality does not exceed the predetermined threshold value for all of the small cells. By providing such simple information as the measurement result, for example, overhead caused by transmission of the measurement result can be suppressed.

(Second Selection Unit 156)

The second selection unit 156 selects a small base station 200 that will not be set in the idle state from the small base stations 200 of the one or more small cells 20 based on the measurement result. In other words, the second selection unit 156 selects a small base station 200 that is in a state in which the small base station can communicate with the terminal devices 300 from the small base stations 200 of the one or more small cells 20 based on the measurement result.

As described above, the measurement result includes, for example, information regarding reception power or quality of the measurement signal. Then, the second selection unit 156 selects the small base station 200 of the small cell 20 that brings the most satisfactory reception power or quality from the small base stations 200 of the one or more small cells 20 as a small base station 200 that will not be set in the idle state. Alternatively, the second selection unit 156 may select small base stations 200 of two or more small cells 20 that bring more satisfactory reception power or quality, instead of the small base station 200 of the small cell 20 that brings the most satisfactory reception power or quality.

As described above, a small base station 200 that will not be set in the idle state (i.e., a small base station 200 that is in the state in which the small base station can communicate with the terminal devices 300) is selected based on the measurement result. Accordingly, a small base station 200 which brings more satisfactory communication quality is selected as a small base station 200 that will not be set in the idle state, rather than, for example, selecting a small base station 200 that is closer to the terminal devices 300. For this reason, while power consumption of the small base stations 200 is reduced, degradation of communication quality of radio communication of the small cells 20 can be suppressed.

Note that, when a demand for performing radio communication in the small cells 20 is notified of by the terminal device 300, the second selection unit 156 selects the small base station 200 that will not be set in the idle state. For example, not only the second selection unit 156, but also the first selection unit 152, the information providing unit 153, the small cell control unit 154, and the measurement result acquisition unit 155 perform the above-described operation only when the units are notified of the demand. Therefore, when the terminal device 300 does not perform radio communication in the small cells 20, the series of operations described above is not performed. Accordingly, useless operations, for example, can be omitted. In addition, the terminal device 300 can be allowed to perform radio communication in the small cells 20, for example, according to a demand of the terminal device 300.

(Small Cell Control Unit 154—Continued)

Next, control of the small cell control unit 154 will be further described.

Control Over Idling (Dormancy) of a Small Base Station

The small cell control unit 154 sets, for example, small base stations 200 other than the small base station 200 selected among the small base stations 200 of the one or more small cells 20 to be in the idle state, rather than setting the selected small base station 200 to be in the idle state.

For example, since the small base stations 200 of the one or more small cells 20 have been activated for transmission of the measurement signals as described above, the small cell control unit 154 resets small base stations 200 other than the selected small base station 200 among the small base stations 200 (which will be referred to hereinafter as "other small base stations 200") to be in the idle state. In this case, the small cell control unit 154 transmits, for example, an idling instruction message for instructing the other small base stations 200 to be in the idle state via the network communication unit 130. Then, the other small base stations 200 enter the idle state, and do not perform transmission in the downlink and reception in the uplink. On the other hand, the selected small base station 200 is not in the idle state and performs transmission in the downlink and reception in the uplink. The small base station 200 is kept in the state in which the station can communicate with the terminal devices 300.

Note that the small base stations 200 of the one or more small cells 20 may only resume transmission in the downlink and may not resume reception in the uplink for transmission of measurement signals as described above. In this case, the small cell control unit 154, for example, transmits the activation instruction message for instructing the selected small base station 200 to be activated while transmitting the idling instruction message to the other small base stations 200 as described above. As a result, the selected small base station 200 also resumes reception in the uplink.

In addition, the small base stations 200 of the one or more small cells 20 may be temporarily activated during transmission of measurement signals, and return to the idle state again after the transmission of measurement signals. In this case, the small cell control unit 154, for example, transmits the activation instruction message for instructing activation to the selected small base station 200. Then, the selected small base station 200 is activated and resumes transmission in the downlink and transmission in the uplink.

As a result of the control described above, the selected small base station 200 is in the state in which the station can communicate with the terminal devices 300, rather than in the idle state, and the other small base stations 200 are in the idle state. Accordingly, the terminal devices 300 can perform radio communication in the small cells 20, and power consumption of the small base stations 200 can be reduced.

(Communication Control Unit 157)

The communication control unit 157 controls radio communication in the macrocell 10. In addition, the communication control unit 157 also controls, for example, radio communication in the small cells 20 by controlling the small base stations 200 or the terminal devices 300.

Particularly in the present embodiment, the communication control unit 157 controls, for example, the terminal devices 300 to use a frequency band for the macrocell 10 as one principal frequency band and to use a frequency band for the small cell 20 of the small base station 200 to be selected as one of one or more auxiliary frequency bands.

To be more specific, the communication control unit 157 controls the terminal devices 300 to, for example, use a CC for the macrocell 10 as a PCC and use a CC for the small cell 20 as an SCC. As an example, the communication control unit 157 transmits an RRC connection reconfiguration message for adding a CC used by the selected small base station 200 as an SCC to the terminal devices 300 via the radio communication unit 120. Then, the terminal devices 300 add the CC as an SCC, and transmit an RRC connection reconfiguration complete message to the macro base station 100. In addition, the communication control unit 157 notifies the selected small base station 200 of the fact that the terminal devices 300 use the CC used by the selected small base station 200 as an SCC. As a result, the terminal devices 300 perform radio communication with the selected small base station 200 using the SCC. A specific example of such carrier aggregation will be described below with reference to FIG. 4.

Figure 4:
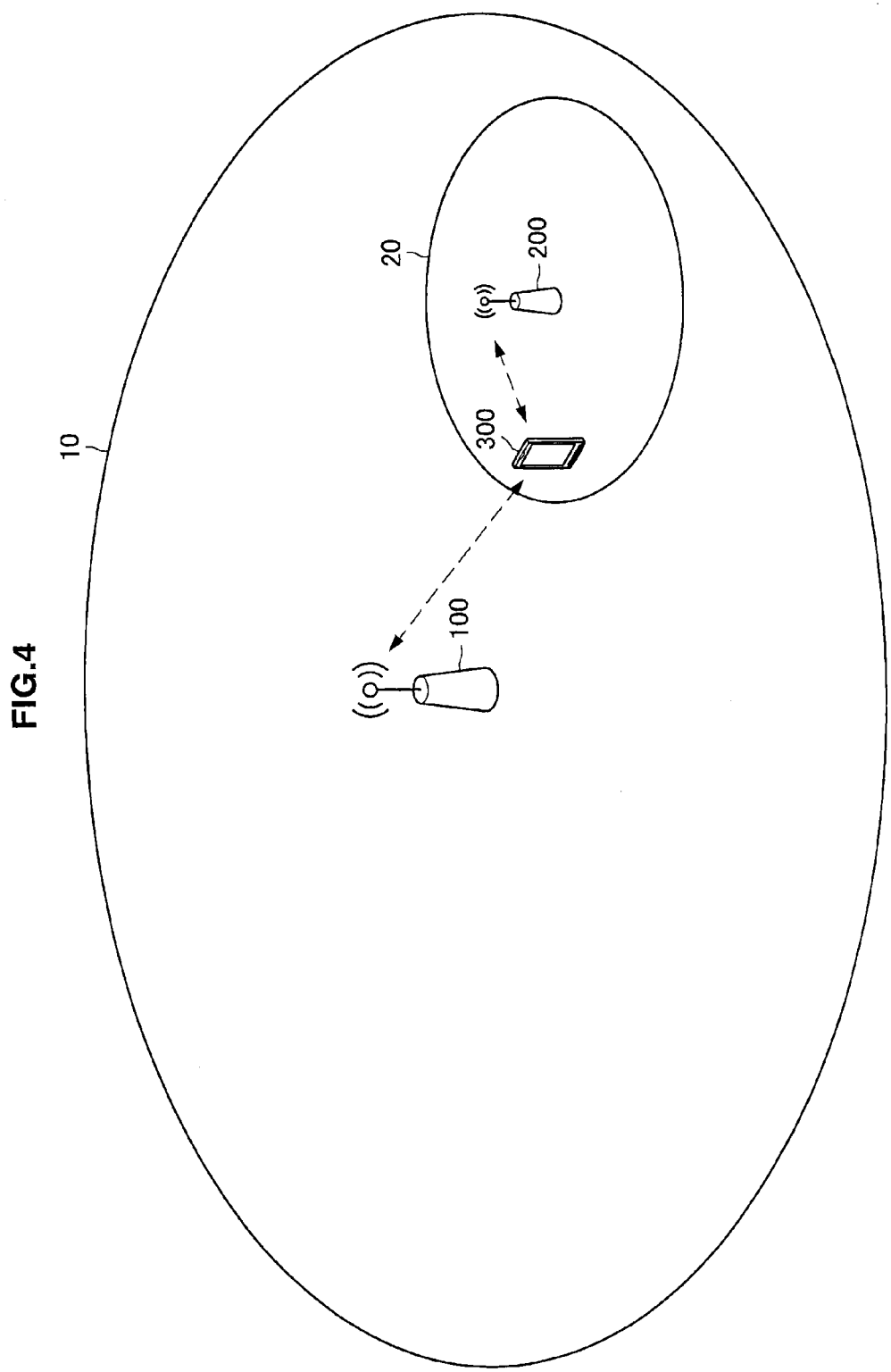
FIG. 4 is an illustrative diagram for describing an example of carrier aggregation according to an embodiment.

FIG. 4 is an illustrative diagram for describing the example of carrier aggregation according to the present embodiment. Referring to FIG. 4, the macro base station 100, the small base station 200, and the terminal device 300 are shown. The small base station 200 is a small base station selected based on a measurement result. The terminal device 300 performs radio communication with the macro base station 100 using a CC for the macrocell 10 as a PCC, and performs radio communication with the small base station 200 using a CC for the small cell 20 as an SCC.

With such carrier aggregation, the terminal device 300 can perform radio communication with the small base station 200 that has been activated as necessary while continuing radio communication with the macro base station 100. Since there is no chance of handover of the PCC as long as the terminal device 300 is positioned with the macrocell 10, for example, a load of signaling for the terminal device 300 can be lightened. In addition, a communication speed of the terminal device 300, for example, can be enhanced. In addition, since measurement with regard to the small cell 20 is necessary for this carrier aggregation, the above-described procedure of measurement is particularly useful.

Note that the process for adding an SCC may include transmission of a media access control (MAC) control element to the terminal device 300, instead of transmission of the RRC connection reconfiguration message to the terminal device 300.

3. Configuration of a Small Base Station

Figure 5:
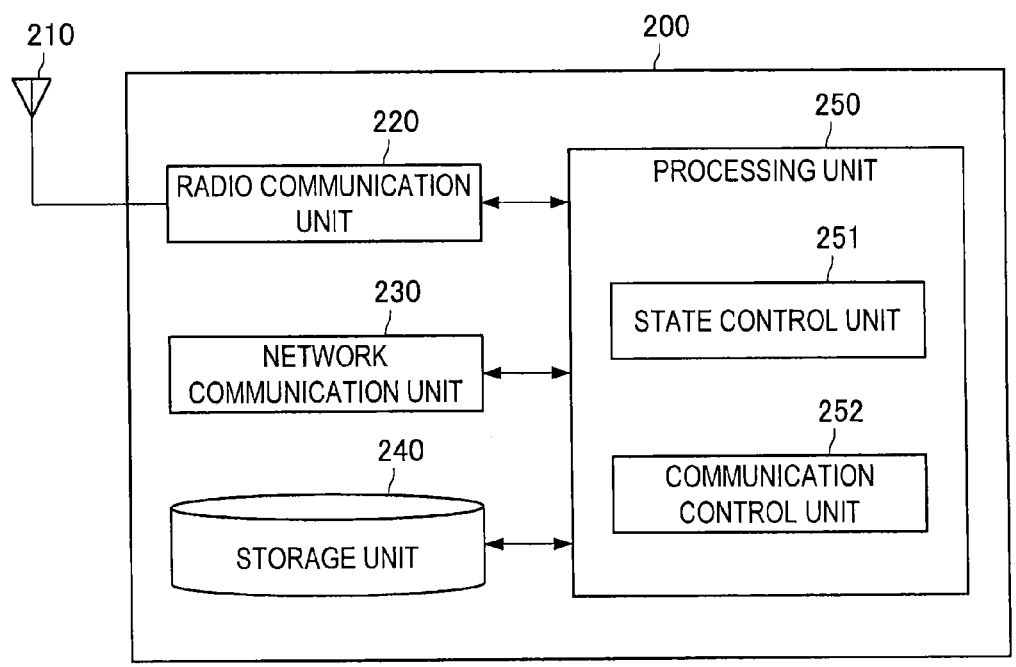
FIG. 5 is a block diagram showing an example of a configuration of a small base station according to an embodiment.

An example of a configuration of the small base station 200 according to the present embodiment will be described with reference to FIG. 5. FIG. 5 is a block diagram showing the example of the configuration of the small base station 200 according to the present embodiment. Referring to FIG. 5, the small base station 200 includes an antenna unit 210, a radio communication unit 220, a network communication unit 230, a storage unit 240, and a processing unit 250.

(Antenna Unit 210)

The antenna unit 210 receives radio signals and outputs the received radio signal to the radio communication unit 220. In addition, the antenna unit 210 transmits transmission signals output by the radio communication unit 220.

(Radio Communication Unit 220)

The radio communication unit 220 performs radio communication with the terminal device 300 positioned within the small cell 20. For example, the radio communication unit 120 performs radio communication with the terminal device 300 using a frequency band for the small cell 20. The frequency band includes, for example, one or more CCs.

Particularly in the present embodiment, the radio communication unit 220 stops radio communication when the small base station 200 is in the idle state. For example, the station stops both transmission in the downlink and reception in the uplink.

(Network Communication Unit 230)

The network communication unit 230 communicates with other communication nodes. For example, the network communication unit 230 communicates with the macro base station 100. In addition, the network communication unit 130 communicates with, for example, other small base stations 200. In addition, the network communication unit 230 communicates with, for example, core network nodes.

(Storage Unit 240)

The storage unit 240 stores programs and data for operations of the small base station 200.

(Processing Unit 250)

The processing unit 250 provides various functions of the small base station 200. The processing unit 250 includes a state control unit 251 and the communication control unit 252.

(State Control Unit 251)

The state control unit 251 controls the small base station 200 such that the small base station 200 is in the idle state. For example, the state control unit 251 causes the radio communication unit 220 to stop transmission in the downlink and/or reception in the uplink. In addition, the state control unit 251 causes the communication control unit 252 to stop control over transmission in the downlink and/or control over reception in the uplink.

In addition, the state control unit 251 controls the small base station 200 such that the small base station 200 is in the state in which the station can communicate with the terminal device 300. That is, the state control unit 251 activates the small base station 200. For example, the state control unit 251 causes the radio communication unit 220 to resume transmission in the downlink and/or reception in the uplink. In addition, the state control unit 251, for example, causes the communication control unit 252 to resume control over transmission in the downlink and/or control over reception in the uplink. Note that, as an initial state, for example, transmission in the downlink and/or reception in the uplink are stopped. In addition, as the initial state, control over transmission in the downlink and/or control over reception in the uplink are stopped.

In addition, the state control unit 251 controls the small base station 200 such that the small base station 200 is in the idle state or the small base station 200 is in the state in which the station can communicate with the terminal device 300 according to control of the macro base station 100. As an example, when the macro base station 100 transmits an activation instruction message for instructing activation to the small base station 200, the state control unit 251 controls the small base station 200 such that the small base station 200 in the state in which the station can communicate with the terminal device 300. In addition, as another example, when the macro base station 100 transmits to the small base station 200 an idling instruction message instructing it to be in the idle state, the state control unit 251 controls the small base station 200 such that the small base station 200 is in the idle state.

Particularly in the present embodiment, when the small base station 200 is selected as a small base station that will not be set in the idle state based on a result of measurement (i.e., measurement result) by the terminal device 300 with regard to the one or more small cells 20, the state control unit 251 does not cause the small base station 200 to be in the idle state. For example, the small base station 200 is selected as a small base station that will not be set in the idle state based on the measurement result. In addition, the small base station 200, for example, has already been activated for transmission of a measurement signal. In this case, the macro base station 100 does not transmit the idling instruction message to the small base station 200. For this reason, the state control unit 251 controls the small base station 200 such that the small base station 200 is not in the idle state.

Note that, as described above, the small base station 200 may resume only transmission in the downlink for transmission of the measurement signal and may not resume reception in the uplink. In this case, the macro base station 100 transmits the activation instruction message to the small base station 200. For this reason, the state control unit 251 controls the small base station 200 such that the small base station 200 is in the state in which the station can communicate with the terminal device 300.

In addition, the small base station 200 of the small cell 20 may be activated first at the time of transmission of the measurement signal and return to the idle state again after the transmission of the measurement signal. In this case, the macro base station 100 transmits the activation instruction message to the small base station 200. For this reason, the state control unit 251 controls the small base station 200 such that the small base station 200 is in the state in which the station can communicate with the terminal device 300.

(Communication Control Unit 252)

The communication control unit 252 controls radio communication in the small cell 20.

For example, the communication control unit 252 controls transmission in the downlink and reception in the downlink by the small base station 200.

Particularly in the present embodiment, the communication control unit 252 controls transmission of a signal for measurement (i.e., measurement signal) by the terminal device 300 with regard to the small cell 20. For example, the communication control unit 252 controls transmission of a downlink signal including the measurement signal. As described above, the downlink signal is, for example, a reference signal. In addition, the small base station 200, for example, may stop transmission in the downlink and control of the transmission as the initial state; however, when the macro base station 100 transmits the activation instruction message for the measurement, the small base station 200 resumes transmission in the downlink and control of the transmission. Thus, the communication control unit 252 controls transmission of the downlink signal including the measurement signal.

Furthermore, particularly in the present embodiment, when the small base station 200 is selected as a small base station that will not be set in the idle state based on the measurement result, for example, the communication control unit 252 controls the terminal device 300 to use a frequency band for the small cell 20 as one of one or more auxiliary frequency bands.

To be more specific, for example, the macro base station 100 notifies the small base station 200 of the fact that the terminal device 300 is set to use a CC for the small cell 20 (i.e., a CC used by the small base station 200) as an SCC. Then, the communication control unit 157 controls the terminal device 300 to use the CC for the small cell 20 as an SCC. As an example, the communication control unit 157 allocates radio resources of the CC of the small cell 20 to the terminal device 300. In addition, as another example, the terminal device 300 is provided with control information regarding the CC of the small cell 20.

4. Configuration of a Terminal Device

Figure 6:
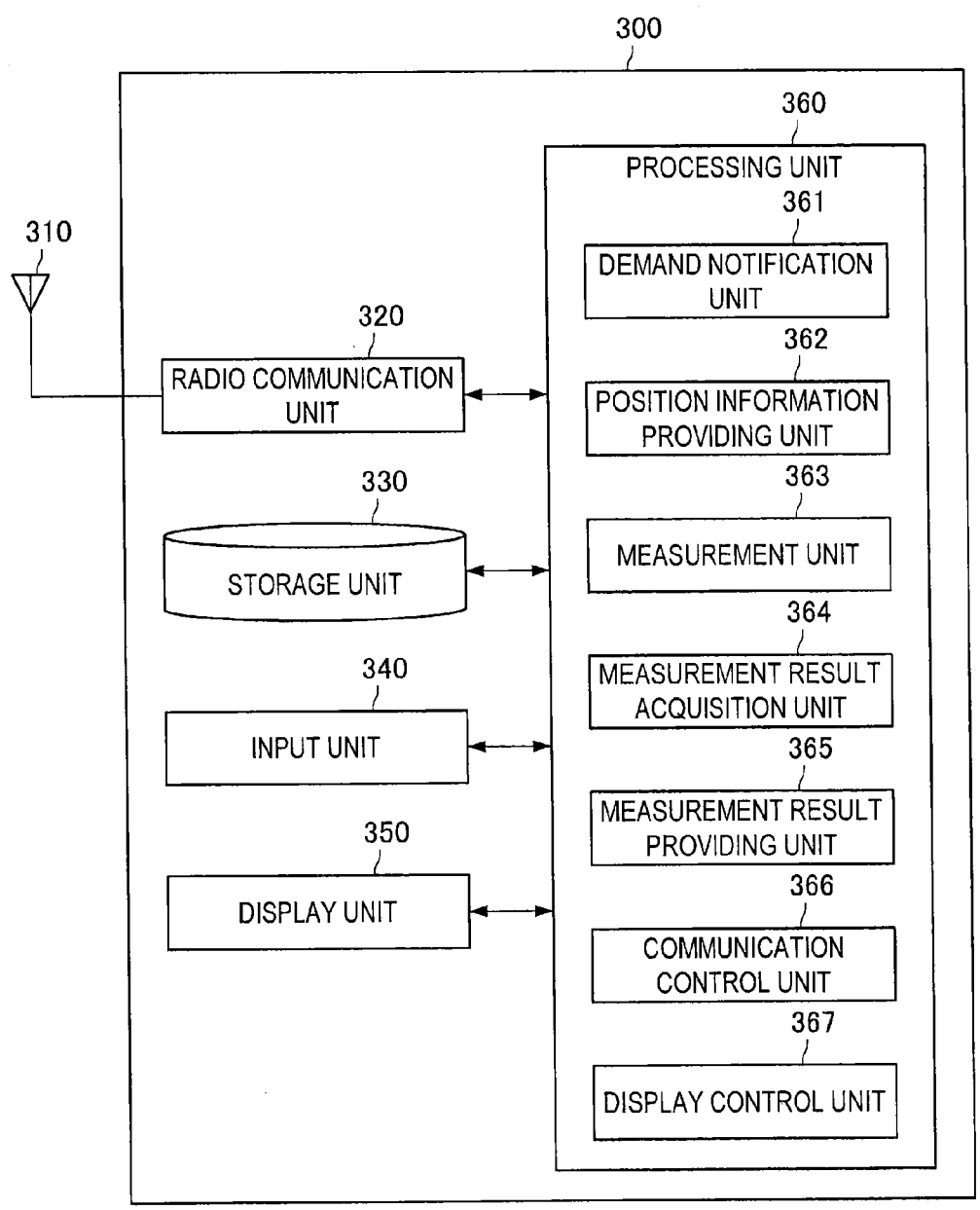
FIG. 6 is a block diagram showing an example of the configuration of a terminal device according to an embodiment.

An example of a configuration of the terminal device 300 according to the present embodiment will be described with reference to FIG. 6. FIG. 6 is a block diagram showing the example of the configuration of the terminal device 300 according to the present embodiment. Referring to FIG. 6, the terminal device 300 includes an antenna unit 310, a radio communication unit 320, a storage unit 330, an input unit 340, a display unit 350, and a processing unit 360.

(Antenna Unit 310)

The antenna unit 310 receives radio signals and outputs the received radio signals to the radio communication unit 320. In addition, the antenna unit 310 transmits transmission signals output by the radio communication unit 320.

(Radio Communication Unit 320)

The radio communication unit 320 performs radio communication with the macro base station 100 when the terminal device 300 is positioned within the macrocell 10. For example, the radio communication unit 320 performs radio communication with the macro base station 100 using the frequency band for the macrocell 10 (for example, one or more CCs).

In addition, the radio communication unit 320 performs radio communication with the small base station 200 when the terminal device 300 is positioned within the small cell 20. For example, the radio communication unit 320 performs radio communication with the small base station 200 using the frequency band for the small cell 20 (for example, one or more CCs).

(Storage Unit 330)

The storage unit 330 stores programs and data for operations of the terminal device 300.

(Input Unit 340)

The input unit 340 receives inputs by a user of the terminal device 300. Then, the input unit 340 provides the result of the inputs to the processing unit 360.

(Display Unit 350)

The display unit 350 displays output screens (i.e., output images) from the terminal device 300. For example, the display unit 350 displays output screens according to control by the processing unit 360 (a display control unit 367).

(Processing Unit 360)

The processing unit 360 provides various functions of the terminal device 300. The processing unit 360 includes a demand notification unit 361, a position information providing unit 362, a measurement unit 363, a measurement result acquisition unit 364, a measurement result providing unit 365, a communication control unit 366, and a display control unit 367.

(Demand Notification Unit 361)

The demand notification unit 361 notifies other devices of a demand of the terminal device 300.

For example, the demand notification unit 361 notifies the macro base station 100 or the small base station 200 of a demand of the terminal device 300 regarding radio communication. As an example, the demand notification unit 361 may notify the macro base station 100 of a demand for performing radio communication in the small cell 20.

(Position Information Providing Unit 362)

The position information providing unit 362 provides position information that indicates a position of the terminal device 300.

For example, the position information providing unit 362 provides the position information to the macro base station 100. To be more specific, for example, the macro base station 100 transmits a position information requesting message of requesting provision of the position information to the terminal device 300. Then, the position information providing unit 362 acquires the position information and provides the information to the macro base station 100.

The position information is acquired through, for example, the Global Positioning System (GPS). Alternatively, the position information may be acquired through positioning by the terminal device 300 using a downlink signal from a plurality of base stations. Alternatively, the position information may be acquired through positioning by a plurality of base stations using an uplink signal from the terminal device 300.

(Measurement Unit 363)

The measurement unit 363 performs measurement with regard to the small cell 20.

For example, the measurement unit 363 performs measurement with regard to one or more small cells 20 based on information regarding the one or more small cells 20 (i.e., small cell information) provided from the macro base station 100. As described above, the small cell information includes, for example, frequency channel information and timing information. Then, the measurement unit 363 performs measurement with a frequency channel indicated by the frequency channel information at a timing indicated by the timing information.

In addition, the measurement is, for example, measurement of reception power or quality of a measurement signal transmitted from the small base station 200. To be more specific, for example, the measurement signal is a reference signal transmitted from the small base station 200 as described above, and the measurement is measurement of RSRP or RSRQ.

(Measurement Result Acquisition Unit 364)

The measurement result acquisition unit 364 acquires the result of measurement with regard to the small cells 20.

Particularly in the present embodiment, the measurement result acquisition unit 364 acquires the result of measurement (i.e., measurement result) with regard to the one or more small cells 20. The content of the measurement result is as described for the measurement result acquisition unit 155 of the macro base station 100.

(Measurement Result Providing Unit 365)

The measurement result providing unit 365 provides the result of measurement with regard to the small cells 20.

Particularly in the present embodiment, the measurement result providing unit 365 provides the result of measurement (i.e., measurement result) with regard to the one or more small cells 20 to the macro base station 100. The content and providing technique of the measurement result are as described for the measurement result acquisition unit 155 of the macro base station 100.

(Communication Control Unit 366)

The communication control unit 366 controls radio communication of the terminal device 300.

Particularly in the present embodiment, for example, the communication control unit 366 controls radio communication of the terminal device 300 such that the terminal device uses a frequency band for the macrocell 10 as one principal frequency band and uses a frequency band for the small cells 20 as one of one or more auxiliary frequency bands. To be more specific, for example, the communication control unit 366 performs a setting with regard to radio communication on the terminal device 300 such that the terminal device uses a CC for the macrocell 10 as a PCC and uses a CC for the small cells 20 as an SCC.

As an example, the terminal device 300 is assumed to perform radio communication with the macro base station 100 using the CC for the macrocell 10 as a PCC. Then, the macro base station 100 notifies the terminal device 300 of an RRC connection reconfiguration message for adding a CC used by a selected small base station 200 as an SCC. Then, the communication control unit 366 adds the CC as an SCC. In addition, the communication control unit 366 transmits an RRC connection reconfiguration complete message to the base station 100 via the radio communication unit 320.

(Display Control Unit 367)

The display control unit 367 controls display of an output screen by the display unit 350. For example, the display control unit 367 generates an output screen to be displayed by the display unit 350, and causes the display unit 350 to display the output screen.

5. Process Flow

Next, an example of a communication control process according to the present embodiment will be described with reference to FIGS. 7 and 8.

First Example

Figure 7:
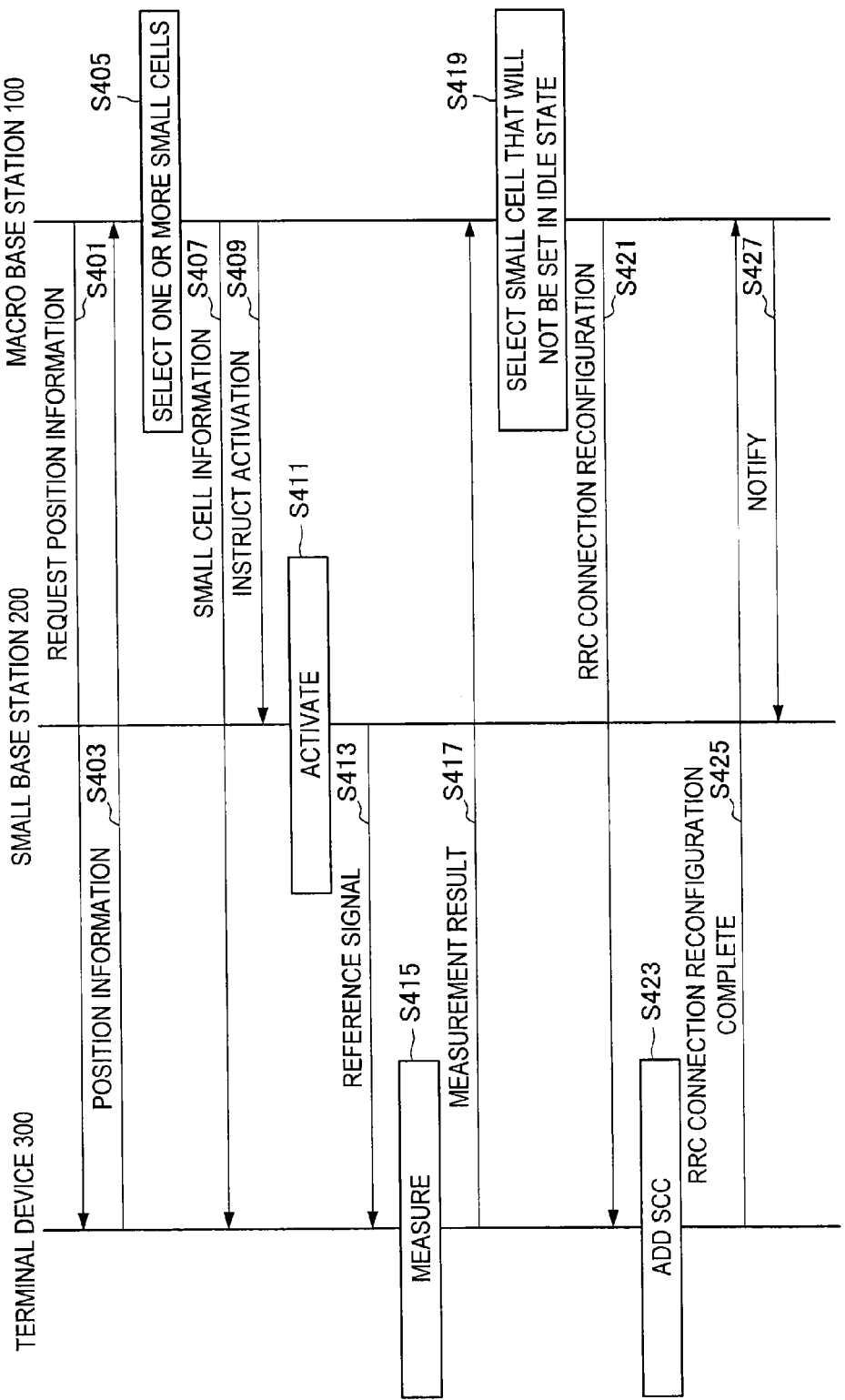
FIG. 7 is a flowchart showing a first example of a schematic flow of a communication control process according to an embodiment.

FIG. 7 is a flowchart showing a first example of a schematic flow of the communication control process according to the present embodiment.

First, the macro base station 100 transmits a position information request message that requests provision of position information that indicates a position of the terminal device 300 to the terminal device 300 (S401). Then, the terminal device 300 acquires the position information and provides the information to the macro base station 100 (S403).

Next, the macro base station 100 selects one or more small cells 20 present in the vicinity of the position of the terminal device 300 indicated by the position information from small cells 20 (S405).

Then, the macro base station 100 provides information regarding the one or more small cells 20 (small cell information) to the terminal device 300 (S407).

In addition, the macro base station 100 transmits an activation instruction message to small base stations 200 of the one or more small cells 20 (S409). Then, the small base stations 200 are activated (S411), and resume transmission of downlink signals including reference signals (S413).

On the other hand, the terminal device 300 performs measurement with regard to the one or more small cells 20 based on the small cell information (S415).

Then, the terminal device 300 provides the result of the measurement (i.e., measurement result) with regard to the one or more small cells 20 to the macro base station 100 (S417).

Then, the macro base station 100 selects a small base station 200 that will not be set in the idle state from the small base stations 200 of the one or more small cells 20 based on the measurement result (S419). Here, the small base station 200 shown in FIG. 7 is set to be selected. Note that the macro base station 100 transmits an idling instruction message for instructing the small base stations 200 other than the selected small base station 200 (i.e., other small base stations 200) from the one or more small base stations 200 to be in the idle state. Then, the other small base stations 200 go into the idle state.

Then, the macro base station 100 transmits the RRC connection reconfiguration message for adding a CC to be used by the selected small base station 200 as an SCC to the terminal device 300 (S421). Then, the terminal device 300 adds the CC used by the selected small base station 200 (CC for the corresponding small cell 20) as an SCC (S423), and transmits the RRC connection reconfiguration complete message to the macro base station 100 (S425).

In addition, the macro base station 100 notifies the selected small base station 200 of the fact that the CC used by the selected small base station 200 will be used as the SCC by the terminal device 300 (S427). Then, the terminal device 300 performs radio communication with the selected small base station 200 using the CC for the small cell 20 as the SCC while performing radio communication with the macro base station 100 using the CC for the macrocell 10 as the PCC.

Second Example

Figure 8:
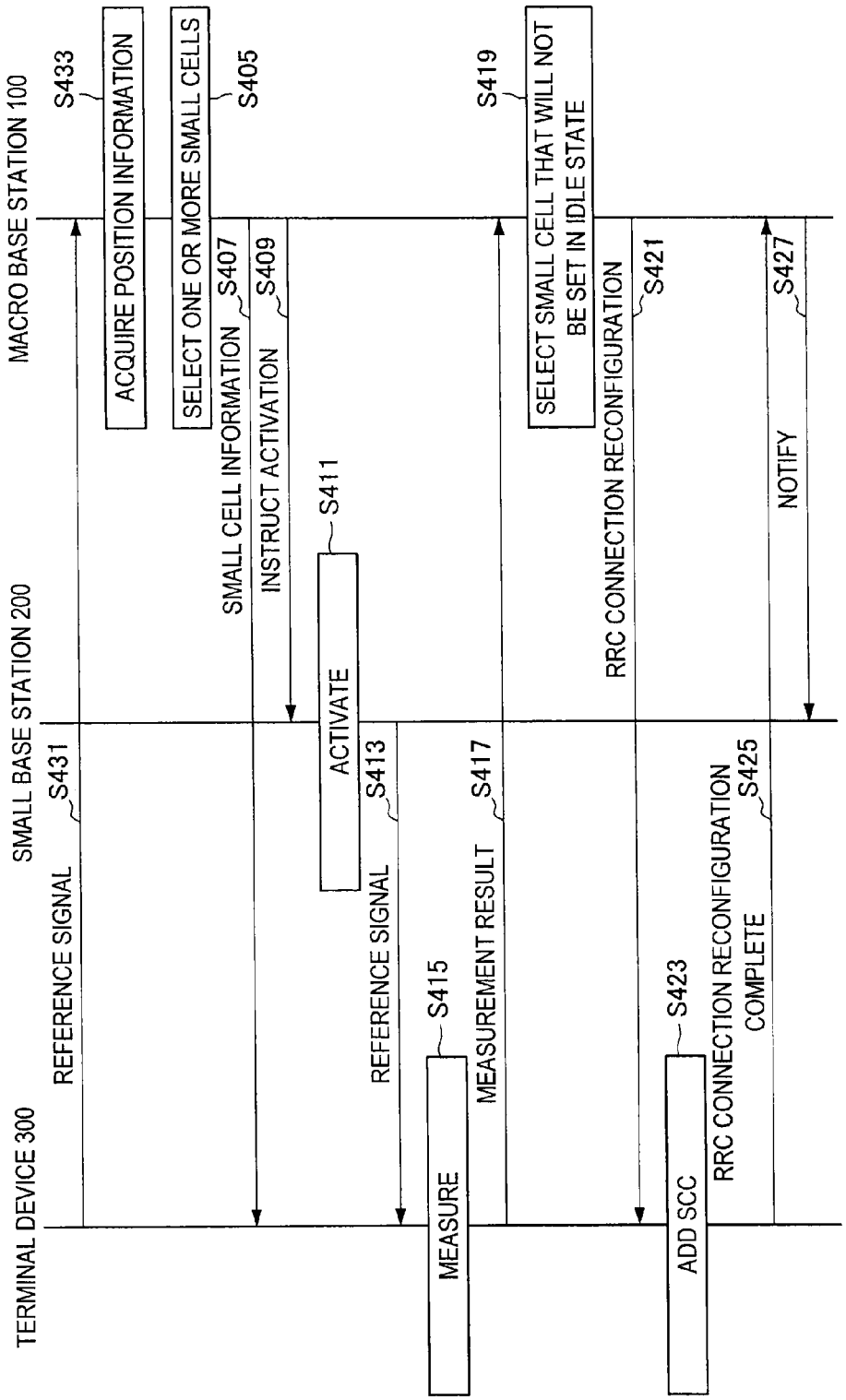
FIG. 8 is a flowchart showing a second example of a schematic flow of a communication control process according to an embodiment.

FIG. 8 is a flowchart showing a second example of a schematic flow of the communication control process according to the present embodiment.

In the second example, the terminal device 300 transmits a reference signal in the uplink (S431). Then, the macro base station 100 acquires the position information through positioning of the terminal device 300 using the reference signal (S433).

Note that the following Steps S405 to S427 are the same as described in the first example with reference to FIG. 7.

6. Modified Examples

Next, a first modified example and a second modified example relating to the present embodiment will be described.

First Modified Example

In the above-described embodiment, the small base stations 200 stop both transmission in the downlink and reception in the uplink when the stations are in the idle state. Embodiments, however, are not limited thereto. In the first modified example of the embodiment, the small base stations 200 stop transmission in the downlink and do not stop reception in the uplink when the stations are in the idle state.

Note that, in the first modified example, for example, the same processes as the communication control processes described with reference to FIGS. 7 and 8 are performed.

Second Modified Example

On the other hand, in the second modified example of the embodiment, the small base stations 200 stop reception in the uplink and do not stop transmission in the downlink when they are in the idle state.

In the second modified example, the small base stations 200 transmit measurement signals (reference signals) in the downlink even when there is no control from the macro base station 100. Thus, for example, some or all of Steps S401 to S413 can be omitted from the communication control process described with reference to FIG. 7.

Third Modified Example

In the example of the above-described embodiment, the small base stations 200 stop communication (transmission in the downlink and/or reception in the uplink) when the stations are in the idle state. Embodiments, however, are not limited thereto. In a third modified example of the embodiment, the small base stations 200 perform radio communication while reducing power consumption, rather than completely stopping radio communication when the stations are in the idle state. For example, the small base stations 200 perform discontinuous transmission (DTX) in the downlink and/or discontinuous reception (DRX) in the uplink when the stations are in the idle state.

7. Application Examples

The technology of the present disclosure can be applied to various products. For example, the macro base station 100 may be realized as any type of Evolved Node B (eNB) such as a macro eNB (MeNB) or a master eNB (MeB). In addition, the small base station 200 may be realized as any type of eNB such as a pico eNB (PeNB), a home eNB (HeNB), or a secondary eNB (SeB). Instead, the macro base station 100 and the small base station 200 may be realized as other types of base stations such as a NodeB or a base transceiver station (BTS). The macro base station 100 and the small base station 200 may each include a main body which controls radio communication (which is also referred to as a base station device) and one or more remote radio heads (RRHs) disposed in a different location from the main body.

In addition, for example, the terminal device 300 may be realized as a mobile terminal such as a smartphone, a tablet personal computer (PC), a notebook PC, a portable game terminal, or a digital camera, or an in-vehicle terminal such as a car navigation device. In addition, the terminal device 300 may be realized as a terminal which performs machine-to-machine (M2M) communication (which is also referred to as a machine-type communication (MTC) terminal). Furthermore, the terminal device 300 may be a radio communication module mounted in such a terminal (for example, an integrated circuit module configured in one die).

7-1. Application Examples of a Base Station

First Application Example

Figure 9:
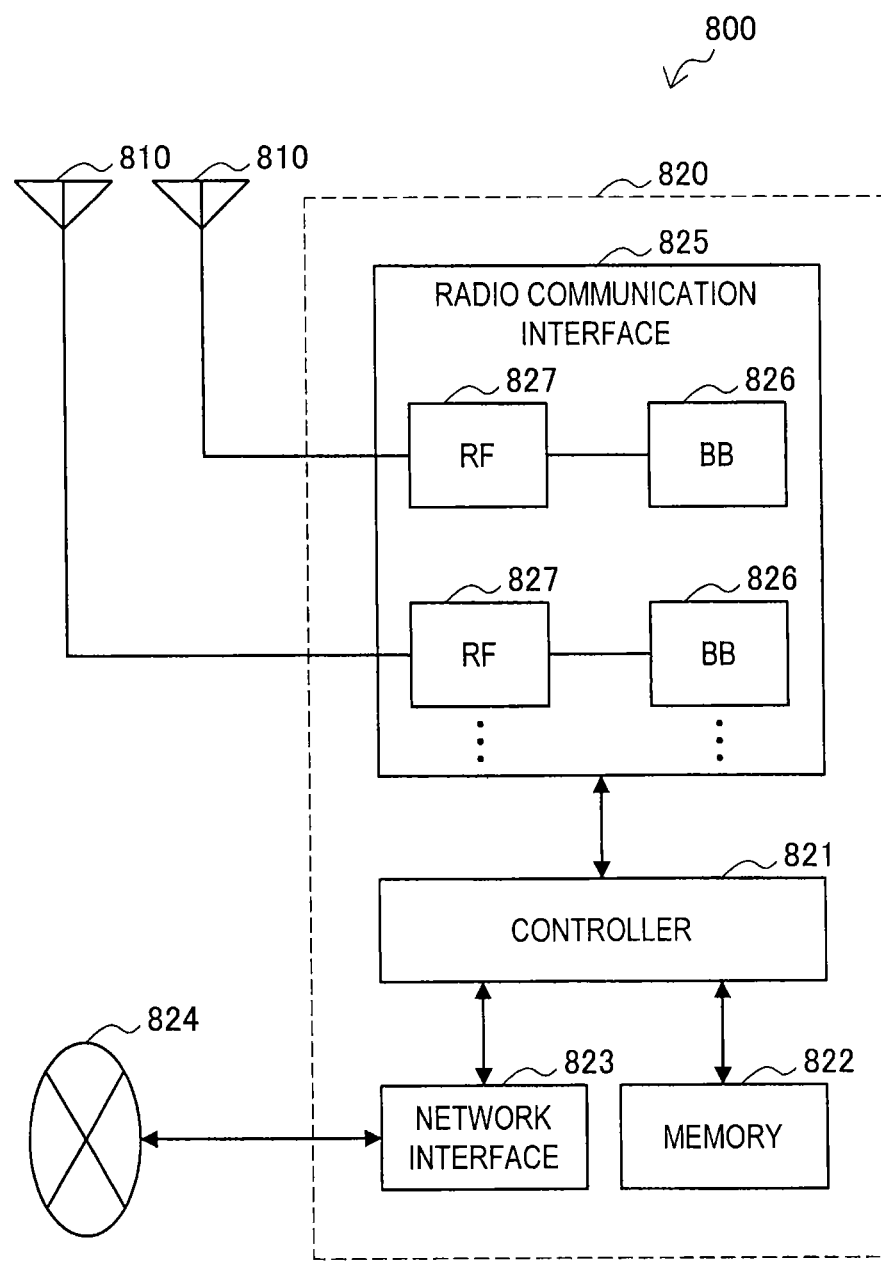
FIG. 9 is a block diagram showing a first example of a schematic configuration of an eNB.

FIG. 9 is a block diagram showing a first example of a schematic configuration of an eNB to which the technology according to the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNB 800 may include a plurality of antennas 810 as shown in FIG. 9, and the plurality of antennas 810 may respectively correspond to a plurality of frequency bands used by the eNB 800, for example. Note that, although FIG. 9 illustrates an example of the eNB 800 including a plurality of antennas 810, the eNB 800 may also include a single antenna 810.

The base station device 820 is equipped with a controller 821, a memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from a plurality of baseband processors, and forward the generated bundled packet. The memory 822 includes a RAM and a ROM, and stores programs executed by the controller 821 as well as various control data (such as a terminal list, transmit power data, and scheduling data, for example).

The network interface 823 is a communication interface for connecting the base station device 820 to a core network 824. The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in a layer 1, a layer 2 (for example, Medium Access Control (MAC), Radio Link Control (RLC), and Packet Data Convergence Protocol (PDCP), and a layer 3 (for example, Radio Resource Control (RRC)). The BB processor 826 may be a module including a memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include a plurality of BB processors 826 as shown in FIG. 9, and the plurality of BB processors 826 may respectively correspond to a plurality of frequency bands used by the eNB 800, for example. In addition, the radio communication interface 825 may also include a plurality of RF circuits 827 as shown in FIG. 9, and the plurality of RF circuits 827 may respectively correspond to a plurality of antenna elements, for example. Note that although FIG. 9 illustrates an example of the radio communication interface 825 including a plurality of BB processors 826 and a plurality of RF circuits 827, the radio communication interface 825 may also include a single BB processor 826 or a single RF circuit 827.

Second Application Example

Figure 10:
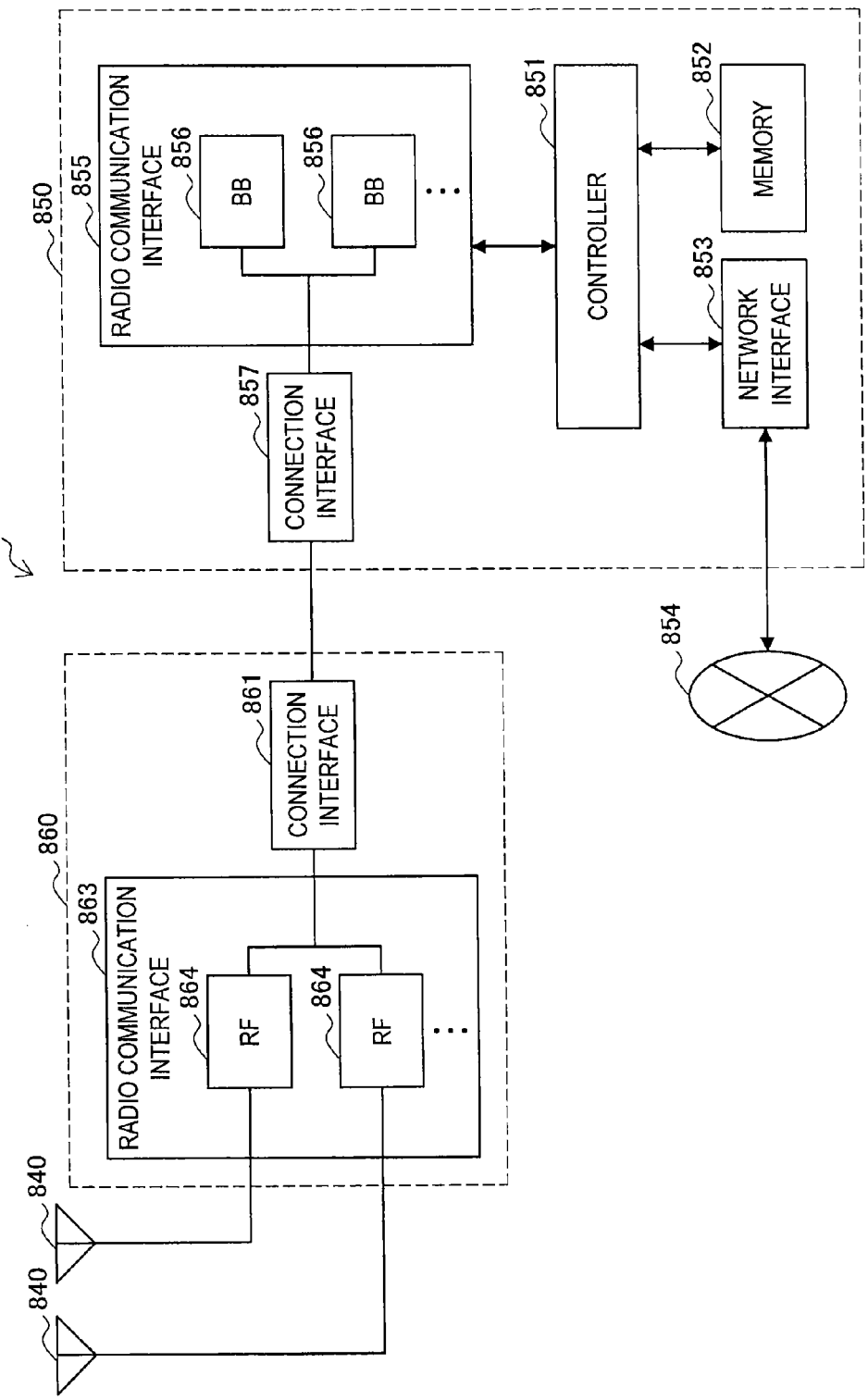
FIG. 10 is a block diagram showing a second example of a schematic configuration of an eNB.

FIG. 10 is a block diagram showing a second example of a schematic configuration of an eNB to which the technology according to the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNB 830 may include a plurality of antennas 840 as shown in FIG. 10, and the plurality of antennas 840 may respectively correspond to a plurality of frequency bands used by the eNB 830, for example. Note that although FIG. 10 illustrates an example of the eNB 830 including a plurality of antennas 840, the eNB 830 may also include a single antenna 840.

The base station device 850 is equipped with a controller 851, a memory 852, a network interface 853, a radio communication interface 855, and a connection interface 857. The controller 851, the memory 852, and the network interface 853 are similar to the controller 821, the memory 822, and the network interface 823 described with reference to FIG. 9.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 9, except for being connected to an RF circuit 864 of the RRH 860 via the connection interface 857. The radio communication interface 855 may also include a plurality of BB processors 856 as shown in FIG. 10, and the plurality of BB processors 856 may respectively correspond to a plurality of frequency bands used by the eNB 830, for example. Note that although FIG. 10 illustrates an example of the radio communication interface 855 including a plurality of BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include a plurality of RF circuits 864 as shown in FIG. 10, and the plurality of RF circuits 864 may respectively correspond to a plurality of antenna elements, for example. Note that although FIG. 10 shows an example of the radio communication interface 863 including a plurality of RF circuits 864, the radio communication interface 863 may also include a single RF circuit 864.

In the eNB 800 and the eNB 830 shown in FIGS. 9 and 10, the processing unit 150 of the macro base station 100 described using FIG. 2 (or each constituent element included in the processing unit 150) and the processing unit 250 of the small base station 200 described using FIG. 5 (or each constituent element included in the processing unit 250) may be implemented in the radio communication interface 825, and the radio communication interface 855 and/or the radio communication interface 863. Also, at least some of these functions may also be implemented in the controller 821 and the controller 851.

7-2. Application Examples of a Terminal Device

First Application Example

Figure 11:
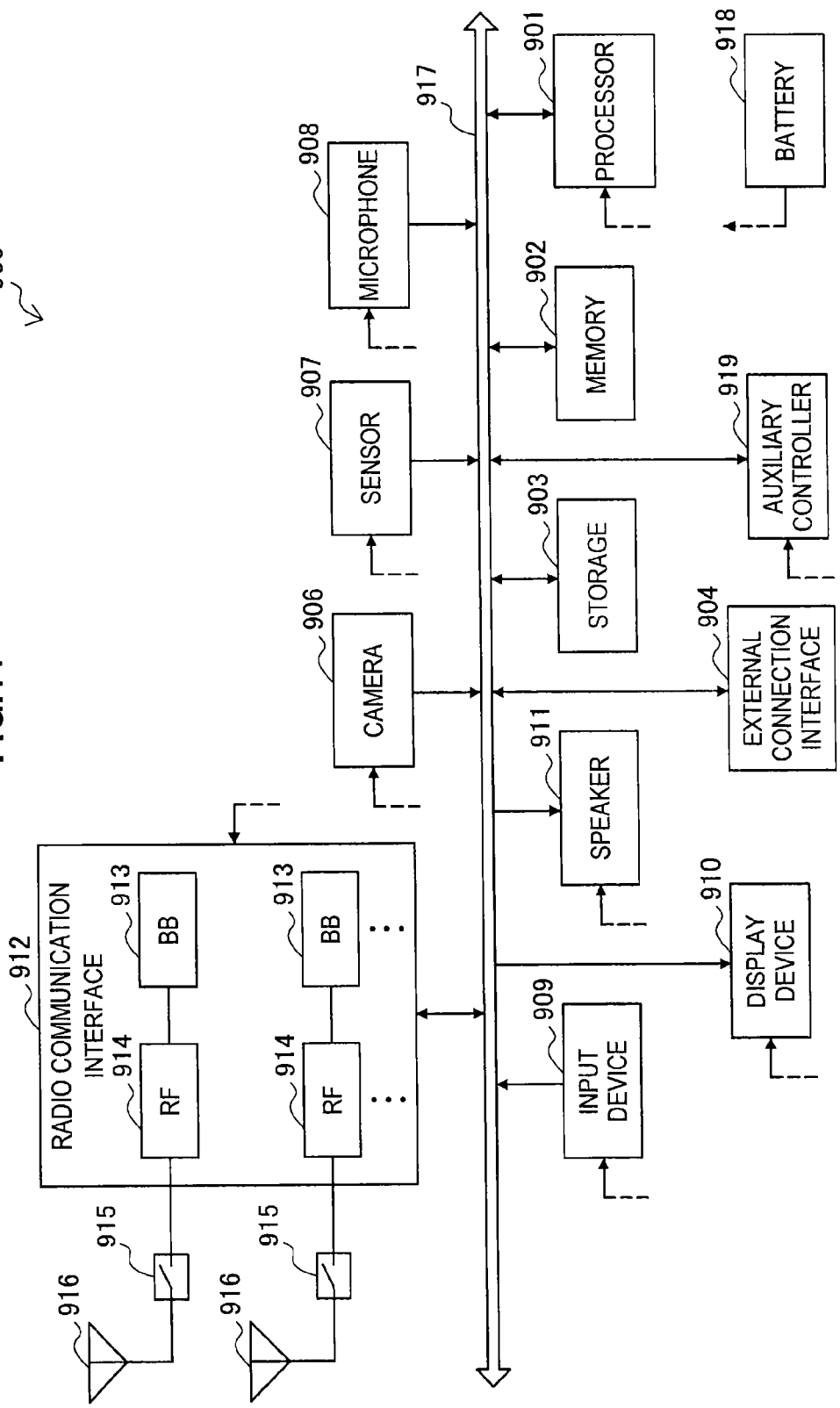
FIG. 11 is a block diagram showing an example of a schematic configuration of a smartphone.

FIG. 11 is a block diagram showing an example of a schematic configuration of a smartphone 900 to which the technology according to the present disclosure may be applied. The smartphone 900 is equipped with a processor 901, a memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as a semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include a plurality of BB processors 913 and a plurality of RF circuits 914 as illustrated in FIG. 11. Note that although FIG. 11 illustrates an example of the radio communication interface 912 including a plurality of BB processors 913 and a plurality of RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among a plurality of circuits included in the radio communication interface 912 (for example, circuits for different radio communication schemes).

Each antenna 916 includes a single or a plurality of antenna elements (for example, a plurality of antenna elements constituting a MIMO antenna), and is used by the radio communication interface 912 to transmit and receive radio signals. The smartphone 900 may also include a plurality of antennas 916 as shown in FIG. 11. Note that although FIG. 11 illustrates an example of the smartphone 900 including a plurality of antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 shown in FIG. 11 via power supply lines partially illustrated with dashed lines in the drawing. The auxiliary controller 919 causes the smartphone 900 to operate minimal necessary functions, for example, in a sleep mode.

In the smartphone 900 shown in FIG. 11, the processing unit 360 of the terminal device 300 described using FIG. 6 (or each constituent element included in the processing unit 360) may be implemented in the radio communication interface 912. Also, at least some of these functions may also be implemented in the processor 901 or the auxiliary controller 919.

Second Application Example

Figure 12:
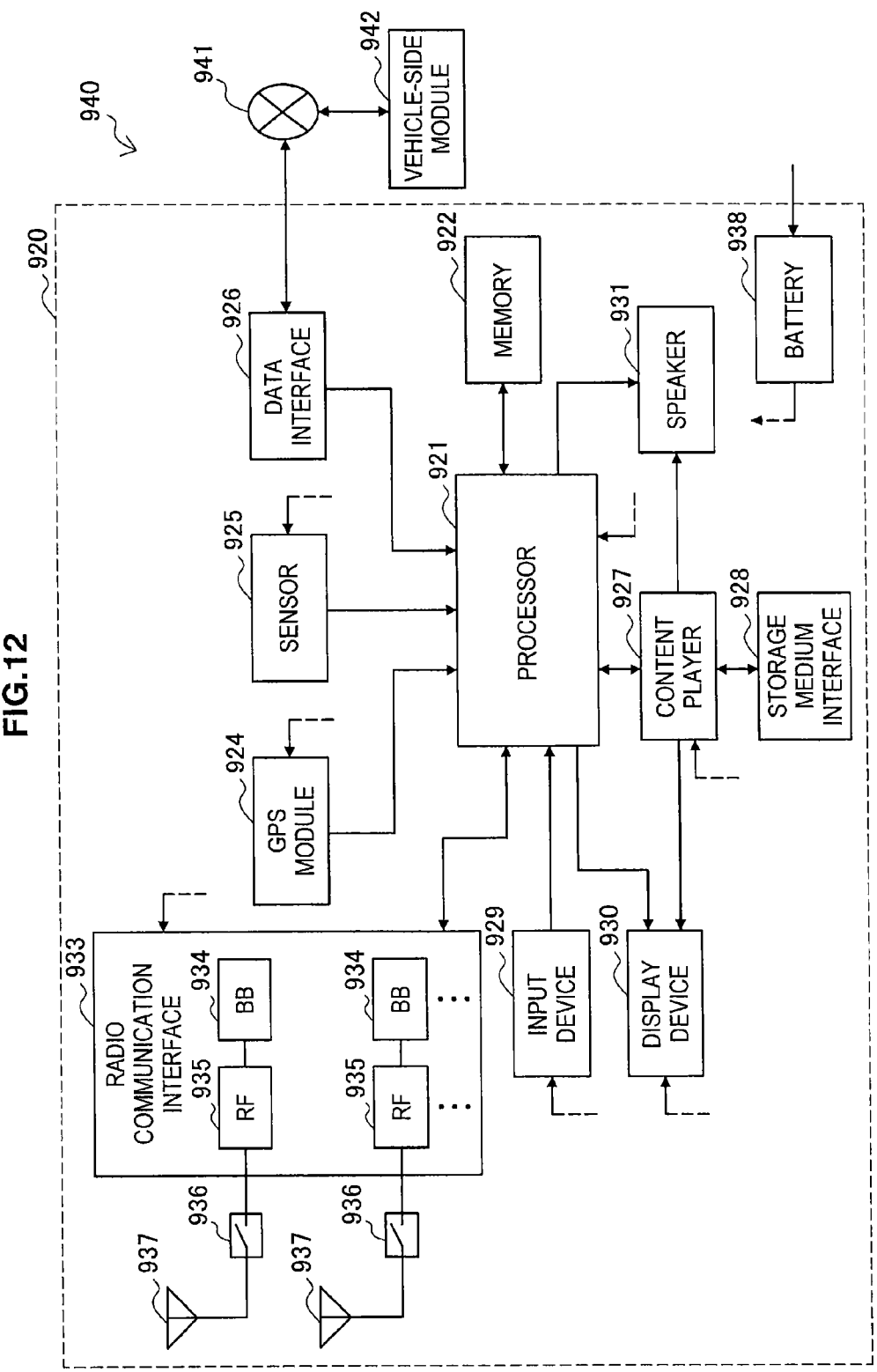
FIG. 12 is a block diagram showing an example of a schematic configuration of a car navigation device.

FIG. 12 is a block diagram illustrating an example of a schematic configuration of a car navigation device 920 to which technology according to an embodiment of the present disclosure may be applied. The car navigation device 920 is equipped with a processor 921, a memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include a plurality of BB processors 934 and a plurality of RF circuits 935 as shown in FIG. 12. Note that although FIG. 12 illustrates an example of the radio communication interface 933 including a plurality of BB processors 934 and a plurality of RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among a plurality of circuits included in the radio communication interface 933 (for example, circuits for different radio communication schemes).

Each antenna 937 includes a single or a plurality of antenna elements (for example, a plurality of antenna elements constituting a MIMO antenna), and is used by the radio communication interface 933 to transmit and receive radio signals. The car navigation device 920 may also include a plurality of antennas 937 as shown in FIG. 12. Note that although FIG. 12 illustrates an example of the car navigation device 920 including a plurality of antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 shown in FIG. 12 via power supply lines partially illustrated with dashed lines in the drawing. Also, the battery 938 stores electric power supplied from the vehicle.

In the car navigation device 920 shown in FIG. 12, the processing unit 360 of the terminal device 300 described using FIG. 6 (or each constituent element included in the processing unit 360) may be implemented in the radio communication interface 933. Also, at least some of these functions may also be implemented in the processor 921.

In addition, the technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

8. Conclusion

So far, the respective nodes and processes according to embodiments of the present disclosure have been described using FIGS. 1 to 8. According to embodiments of the present disclosure, the measurement result acquisition unit 155 acquires the result of measurement (i.e., measurement result) performed by the terminal device 300 with respect to one or more small cells 20. In addition, the second selection unit 156 selects the small base station 200 that will not be set in the idle state from small base stations 200 of the one or more small cells 20 based on the measurement result.

Accordingly, for example, a small base station 200 that is closer to the terminal device 300 is not necessarily selected, and a small base station 200 that brings more satisfactory communication quality is selected as a small base station 200 that will not be set in the idle state. For this reason, while power consumption of the small base stations 200 is reduced, degradation of communication quality of radio communication in a small cell 20 can be suppressed.

In addition, for example, the first selection unit 152 selects the one or more small cells 20 based on the position information that indicates a position of the terminal device 300.

Accordingly, for example, a small base station 200 having a possibility of performing radio communication with the terminal device 300 is selected, and a small base station 200 having no possibility of performing radio communication with the terminal device 300 is not selected. As a result, power consumption can be further reduced.

In addition, for example, the small cell control unit 154 does not cause the selected small base station 200 to be in the idle state and causes a small base station 200 other than the selected small base station 200 among small base stations 200 of the one or more small cells 20 to be in the idle state.

Accordingly, the terminal device 300 can perform radio communication in the small cells 20 and power consumption of the small base stations 200 can be reduced.

In addition, for example, the small cell control unit 154 causes the small base stations 200 of the one or more small cells 20 to transmit a signal for measurement.

Accordingly, even in the state in which the small base stations 200 are in the idle state and transmission in the downlink is not performed, measurement with regard to the one or more small cells 20 can be thereafter performed.

In addition, for example, the transmission control unit 152 provides information regarding the one or more small cells 20 (i.e., small cell information) to the terminal device 300.

Accordingly, a load of measurement on the terminal device 300 can be lightened.

In addition, for example, the small cell information includes information that indicates a frequency channel on which the signal for measurement is transmitted by each of the small base stations 200 of the one or more small cells 20 (i.e., frequency channel information).

Accordingly, for example, the terminal device 300 can receive the signal for measurement without searching for a frequency channel on which the signal for measurement is transmitted. For this reason, a load of measurement on the terminal device 300 can be lightened.

In addition, for example, the small cell information includes information that indicates timings at which the signal for measurement is transmitted by each of the small base stations 200 of the one or more small cells 20 (which is referred to as "timing information").

Accordingly, for example, the terminal device 300 can start reception of a signal at the timing at which the signal for measurement is transmitted. That is, it is not necessary for the terminal device 300 to continuously receive the signal over a long period of time. For this reason, a load of measurement on the terminal device 300 can be lightened.

In addition, for example, the communication control unit 157 controls the terminal device 300 such that the terminal device uses the frequency band for the macrocell 10 as one principal frequency band and uses the frequency band for the small cell 20 of the selected small base station 200 as one of one or more auxiliary frequency bands.

With such carrier aggregation, the terminal device 300 can also perform radio communication with a small base station 200 that is activated when necessary while continuing radio communication with the macro base station 100. For example, as long as the terminal device 300 is positioned within the macrocell 10, there is no chance of handover of a PCC, and thus a load of signaling for the terminal device 300 can be lightened. In addition, for example, a communication speed of the terminal device 300 can be enhanced. Furthermore, since measurement with regard to the small cells 20 is necessary for such carrier aggregation, the procedure of measurement described above is particularly effective.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

Although the example in which the communication system conforms to LTE or LTE-A has been described, the present disclosure is not limited to the related examples. For example, the communication system may be a system that conforms to a different communication standard.

Also, the processing steps in the communication processes in this specification are not strictly limited to being executed in a time series following the sequence described in the flowcharts. For example, the processing steps in the communication processes may be executed in a sequence that differs from the sequence described herein as flowcharts, and furthermore may be executed in parallel.

In addition, a computer program for causing hardware such as a CPU, a ROM, and a RAM installed in communication control devices (base station devices of a macro base station and a small base stations) or a terminal device to exhibit the same functions as the respective configurations of the aforementioned communication control device or terminal device can also be created. In addition, a storage medium for storing the computer program may also be provided. In addition, an information processing device (for example, a processing circuit or a chip) that includes a memory for storing the computer program (for example, a ROM and a RAM) and a processor that executes the computer program (for example, a CPU) may also be provided.

In addition, the effects described in the present specification are merely explanatory or illustrative, and not limitative. In other words, the technology according to the present disclosure can exhibit, along with or instead of the effects, other effects apparent to those skilled in the art from the description of the present specification.

Additionally, the present technology may also be configured as below.

(1)

A communication control device including:
an acquisition unit configured to acquire a result of measurement performed by a terminal device with regard to one or more small cells which are partly or entirely overlapped by a macrocell; and
a selection unit configured to select a base station which is not to be set in an idle state from base stations of the one or more small cells based on the result of the measurement.

(2)

The communication control device according to (1), wherein the one or more small cells are small cells selected based on position information which indicates a position of the terminal device.

(3)

The communication control device according to (1) or (2), further including:
a control unit configured to control the base stations of the one or more small cells,
wherein the control unit refrains from causing the selected base station to be in the idle state, and causes a base station other than the selected base station among the base stations of the one or more small cells to be in the idle state.

(4)

The communication control device according to (3), wherein the control unit causes the base stations of the one or more small cells to transmit a signal for the measurement.

(5)

The communication control device according to any one of (1) to (4), further including:

a providing unit configured to provide information regarding the one or more small cells to the terminal device.

(6)

The communication control device according to (5), wherein the information regarding the one or more small cells includes information which indicates a frequency channel on which a signal for the measurement is transmitted by each of the base stations of the one or more small cells.

(7)

The communication control device according to (5) or (6), wherein the information regarding the one or more small cells includes information which indicates a timing at which a signal for the measurement is transmitted by each of the base stations of the one or more small cells.

(8)

The communication control device according to (7), wherein the timing depends on time taken for each of the base stations of the one or more small cells to be activated from the idle state.

(9)

The communication control device according to (7) or (8), wherein the signal for the measurement is a reference signal.

(10)

The communication control device according to any one of (1) to (9), wherein the result of the measurement includes information regarding reception power or quality of a signal for the measurement.

(11)

The communication control device according to any one of (1) to (10), wherein the result of the measurement is information regarding part of the one or more small cells.

(12)

The communication control device according to any one of (1) to (11), wherein, when reception power or quality of a signal for the measurement with regard to all of the one or more small cells does not exceed a predetermined threshold value, the result of the measurement includes information which indicates that the reception power or the quality with regard to all of the small cells does not exceed the predetermined threshold value.

(13)

The terminal device according to any one of (1) to (12), wherein the selection unit selects the base station that is not to be set in the idle state when notification of a demand for performing radio communication in a small cell is given by the terminal device.

(14)

The terminal device according to any one of (1) to (13), wherein the terminal device is able to perform radio communication using one principal frequency band and one or more auxiliary frequency bands, and
wherein the communication control device further includes a communication control unit configured to control the terminal device to use a frequency band for the macrocell as the one principal frequency band and to use a frequency band for the small cell of the selected base station as one of the one or more auxiliary frequency bands.

(15)

A communication control method including:
acquiring a result of measurement performed by a terminal device with regard to one or more small cells which are partly or entirely overlapped by a macrocell; and
selecting, using a processor, a base station which is not to be set in an idle state from base stations of the one or more small cells based on the result of the measurement.

(16)

A communication control device including:
a communication control unit configured to control transmission of a signal for measurement performed by a terminal device with regard to a small cell which is partly or entirely overlapped by a macrocell; and
a state control unit configured to refrain from causing a base station of the small cell to be in an idle state when the base station of the small cell is selected as a base station that is not to be set in the idle state based on a result of the measurement.

(17)

A terminal device including:
an acquisition unit configured to acquire a result of measurement with regard to one or more small cells which are partly or entirely overlapped by a macrocell; and
a providing unit configured to provide the result of the measurement to a communication control device which selects a base station which is not to be set in an idle state from base stations of the one or more small cells based on the result of the measurement.

REFERENCE SIGNS LIST 1 communication system
10 macrocell
20 small cell
100 macro base station
151 position information acquisition unit
152 first selection unit
153 information providing unit
154 small cell control unit
155 measurement result acquisition unit
156 second selection unit
157 communication control unit
200 small base station
251 state control unit
253 communication control unit
300 terminal device
361 demand notification unit
362 position information providing unit
363 measurement unit
364 measurement result acquisition unit
365 measurement result providing unit
366 communication control unit

The invention claimed is:

1. A communication control device comprising:
circuitry configured to
control base stations of one or more small cells which are partly or entirely overlapped by a macrocell to transmit signals for measurement by a terminal device and decide a timing at which each of the signals is transmitted in accordance with a time taken for a corresponding one of the base stations to be activated from an idle state;
transmit small cell information to the terminal device, the small cell information comprising a list including the timing at which each of the signals is transmitted and information that indicates a frequency channel at which each of the signals is transmitted;
acquire a result of the measurement performed by the terminal device with regard to said one or more small cells; and
select a base station which is not to be set in the idle state from base stations of the one or more small cells based on the result of the measurement.

2. The communication control device according to claim 1, wherein the one or more small cells are small cells selected based on position information which indicates a position of the terminal device.

3. The communication control device according to claim 1, wherein the circuitry is further configured to
control the base stations of the one or more small cells; and
refrain from causing the selected base station to be in the idle state, and cause a base station other than the selected base station among the base stations of the one or more small cells to be in the idle state.

4. The communication control device according to claim 1, wherein each of the signals for the measurement is a reference signal.

5. The communication control device according to claim 1, wherein the result of the measurement includes information regarding reception power or quality of a signal for the measurement.

6. The communication control device according to claim 1, wherein the result of the measurement is information regarding part of the one or more small cells.

7. The communication control device according to claim 1, wherein, when reception power or quality of a signal for the measurement with regard to all of the one or more small cells does not exceed a predetermined threshold value, the result of the measurement includes information which indicates that the reception power or the quality with regard to all of the small cells does not exceed the predetermined threshold value.

8. The communication control device according to claim 1, wherein the circuitry is configured to select the base station that is not to be set in the idle state when notification of a demand for performing radio communication in a small cell is given by the terminal device.

9. The communication control device according to claim 1,
wherein the terminal device is able to perform radio communication using one principal frequency band and one or more auxiliary frequency bands, and
wherein the circuitry is further configured to control the terminal device to use a frequency band for the macrocell as the one principal frequency band and to use a frequency band for the small cell of the selected base station as one of the one or more auxiliary frequency bands.

10. A communication control method comprising:
controlling base stations of one or more small cells which are partly or entirely overlapped by a macrocell to transmit signals for measurement by a terminal device and deciding a timing at which each of the signals is transmitted in accordance with a time taken for a corresponding one of the base stations to be activated from an idle state;
transmitting small cell information to the terminal device, the small cell information comprising a list including the timing at which each of the signals is transmitted and information that indicates a frequency channel at which each of the signals is transmitted;
acquiring a result of the measurement performed by the terminal device with regard to said one or more small cells; and
selecting, using a processor, a base station which is not to be set in the idle state from base stations of the one or more small cells based on the result of the measurement.

11. A communication control device comprising:

circuitry configured to control transmission of a signal for measurement performed by a terminal device with regard to a small cell which is partly or entirely overlapped by a macrocell and decide a timing at which the signal is transmitted in accordance with a time taken for a base station of the small cell to be activated from an idle state;

transmit small cell information to the terminal device, the small cell information comprising a list including the timing of the signal and information that indicates a frequency channel at which the signal is transmitted; and refrain from causing the base station of the small cell to be in an idle state when the base station of the small cell is selected as a base station that is not to be set in the idle state based on a result of the measurement.

12. A terminal device comprising:

circuitry configured to receive signals from base stations of one or more small cells which are partly or entirely overlapped by a macrocell, each of the signals being received at a timing decided in accordance with a time taken for a corresponding one of the base stations to be activated from an idle state;

receive small cell information comprising a list including the timing at which each of the signals is received and information that indicates a frequency channel at which each of the signals is transmitted;

determine a result of measurement with regard to the one or more small cells; and provide the result of the measurement to a communication control device which selects a base station which is not to be set in the idle state from the base stations of the one or more small cells based on the result of the measurement.

* * * * *